United States Patent [19]

Hoefer et al.

[11] Patent Number: 4,977,207

[45] Date of Patent: Dec. 11, 1990

[54] WATER DILUTABLE LEVERLER COATING COMPOSITIONS

[75] Inventors: Rainer Hoefer, Duesseldorf; Roland Gruetzmacher, Wuelfrath; Wolfgang Gress, Wuppertal-Elberfeld; Ulrich Nagorny, Hilden, all of Fed. Rep. of Germany

[73] Assignee: Henkel Kommanditgesellschaft auf Aktien, Duesseldorf-Holthausen, Fed. Rep. of Germany

[21] Appl. No.: 154,732

[22] Filed: Feb. 11, 1988

[30] Foreign Application Priority Data

Feb. 12, 1987 [DE] Fed. Rep. of Germany ....... 3704350

[51] Int. Cl.$^5$ .................... C08G 18/66; C08G 18/36; C08L 75/04; C08L 61/28

[52] U.S. Cl. .................... 524/507; 524/539; 524/542; 524/591; 524/839; 524/840; 428/423.1

[58] Field of Search .............. 524/839, 840, 507, 539, 524/542, 591; 428/423.1

[56] References Cited

U.S. PATENT DOCUMENTS

| | | | |
|---|---|---|---|
| 3,412,054 | 11/1968 | Milligan et al. | 260/18 |
| 4,277,380 | 7/1981 | Williams et al. | 260/18 |
| 4,489,135 | 12/1985 | Drexler et al. | 428/423.1 |
| 4,555,564 | 12/1985 | Fischer et al. | 528/295.3 |
| 4,558,090 | 12/1985 | Drexler et al. | 524/591 |

FOREIGN PATENT DOCUMENTS

| | | | |
|---|---|---|---|
| 2031920 | 4/1980 | United Kingdom | 524/840 |
| 2100271 | 12/1982 | United Kingdom | 524/839 |

OTHER PUBLICATIONS

C. A. May (ed) *Epoxy Resins Chemistry and Technology*, 1988, p. 936.
Chemical Economics Handbook-SRI International, *Plasticizers*, "Epoxy Esters", 7/88.
Chem Sources U.S.A., 1986 *Plasticizers, Epoxy*, p. 733.
Nylen, Modern Surface Coatings, 1965, pp. 698–701.
Agnew Chemie, 82, 53 (to follow).

*Primary Examiner*—C. Warren Ivy
*Attorney, Agent, or Firm*—Ernest G. Szoke; Wayne C. Jaeschke; Norvell E. Wisdom, Jr.

[57] ABSTRACT

A leveler coating composition comprising a water-dilutable polyurethane aqueous dispersion having a solids content of 10–50% by weight and a viscosity of 10–50,000 mPa.s; a process for manufacturing the coating; and a method for using it in automotive finishes.

21 Claims, No Drawings

WATER DILUTABLE LEVERLER COATING COMPOSITIONS

BACKGROUND OF THE INVENTION

1. Field of the Invention

This invention relates to water dilutable coating compositions useful as a "leveler" (i.e. "surfacer" or "filler") coating in multilayered coatings, especially for use in the automotive industry, based on aqueous polyurethane dispersions. It also relates to a process for the production of the leveler compositons and to their use in the automotive inudstry.

2. Statement of Related Art

At the begininng of the age of the motor car, painting was a time consuming, complex process in which several different paint layers were successively applied with repeated interruptions through long drying times and rubbing processes [see the chapter "Automobile Finishing" in Nylen, et al., Modern Surface Coatings, Interscience (pub.) New York, 1965. ]

In the nineteen twenties, this procedure was superceded by quick drying nitrocellulose (NC) paints. NC paints in the automotive industry were replaced after the Second World War by amine-neutralized alkyd resins which were in turn partly replaced or complemented by acrylate resins.

A modern paint line for painting car bodies comprises succesive stations for: degreasing, phosphating, cathodic electrodeposition (CED), undersealing, leveler coating application, and surface coating. In the case of metallic paints, the surface coat in turn comprises a base layer and a finishing clear varnish [see Goldschmidt, et al., "Lackieren von Metall und organischen Materialien" in Glasurit-Handbuch, 11th Edition, Hannover 1984. ]

In modern automobile painting, the leveler or filler performs a particular function. It smoothes out any unevenness and roughness from the CED on the metallic substrate and prepares the substrate for the following surface coat. Since it is desireable to reduce the need for labor intensive rubbing as far as possible, particularly good levelling of the surface is required.

In addition, the leveler as the second surface coat of the paint finish, is intended to complement and enhance the corrosion inhibiting properties of CED. To perform this function, stone throw resistance, resistance to other mechanical influences and adhesion to the substrate have to satisfy particularly stringent requirements.

In addition to adhesion to the substrate, the leveler also should impart good adhesion to the surface coat or to the base layer of a metallic paint. Furthermore, in modern high speed paint lines, the leveler is required to dry rapidly and thoroughly, even in thick layers, at the usual stoving temperatures of 120° to 170° C.

In the majority of autmobile factories, the levelers used are solvent containing stoving lacquers. For economic reasons and to reduce environmental pollution, efforts are being made to avoid organic solvents in coating compositions as far as possible.

U.S. Pat Nos. 4,489,135 and 4,558,090, and corresponding European patent document No. 89,497 describe coating compositions containing a polyurethane dispersion, for forming the base layer of a metallic paint. However, there is a considerable technical difference in terms of application and requirement profile between the base layer of a metallic paint and a leveller coating.

U.S. Pat Nos. 4,489,135 and 4,558,090 describe polyurethane dispersions which contain a linear polyether and/or polyester diol having a molecular weight of from 400 to 3000.

The basic principle of preparing water dilutable polyurethane dispersions by incorporation of a 2,2-di(hydroxymethyl)-carboxylic acid in a polyurethane chain containing at least one other polyol is described in U.S. Pat. No. 3,412,054. The various possible methods for producing polyurethane ionomers are comprehensively presented in Dietrich et al., in Angew. Chemie 82, 53 (1970). However, this disclosure is not sufficient for formulating polyurethane dispersions which are generally compatible with water dilutable polyesters and which are also suitable for specific use as leveler coatings.

The "oil-modified" polyurethane dispersions described in U.S. Pat. No. 4,277,380 teach away from the present invention, because "oil-modified polyurethane dispersions" are understood to be products which, besides diisocyanate, contain only dimethylolpropionic acid or other polyol components and unsaturated "fatty acid ester polyols" (defined as polyesters of unsaturated triglycerides or unsaturated fatty acids and low molecular weight polyfunctional alcohols) as the polyurethane components.

U.S. Pat. No. 4,555,564 (and corresponding German patent document No. 33 18 595) describe aqueous alkyd resins compositons for surface coating.

DESCRIPTION OF THE INVENTION

Other than in the operating examples, or where otherwise indicated, all numbers expressing quantities of ingredients or reaction conditions used herein are to be understood as modified in all instances by the term "about".

The present invention provides new water dilutable coating compositions useful as a leveler or filler, especially for multilayer automotive coatings. They are based on aqueous polyurethane dispersions which predominantly contain water as the solvent, or as the continuous phase of a dispersion in which organic solvents are present in only minimal quantities, if at all. The inventive aqueous polyurethane dispersions have a solids content of from 10 to 50% and a dispersion viscosity of from 10 to 50,000 (preferably 10 to 5 000) mPa.s. A millePascal second (mPa.s) is approximately equivalent to a centipoise second (cp.s). The invention also provides a process for the production of the above coating compositions.

Water dilutable coating compositions according to the invention are distinguished in that the polyurethane dispersion comprises, preferably consists essentially of, most preferably consists of:

(a) one or more hydroxyl-terminated polyether polyols having a functionality of at least 3 and a weight average molecular weight of from 1,000 to 20,000, (preferably 3,000 to 12,000);

(b) one or more (optionally alkoxylated) oleopolyols;

(c) one or more dihydroxy and/or diamino compounds containing anionic moieties; and (d) one or more organic diisocyanates.

By virtue of the high functionality of the polyether polyols and their high molecular weight, it is possible to provide waterdilutable containing compositions which result in leveler coatings having improved crosslinking and therefore greater hardness.

According to the invention, the polyether polyols correspond to the following formula

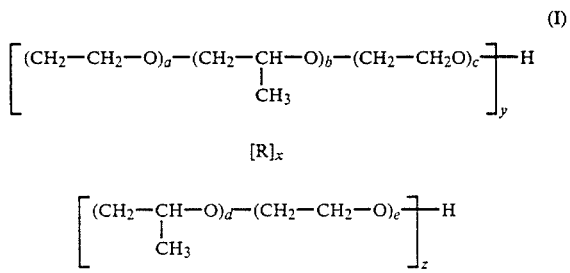

in which R is a glycerol, trimethylolpropane, trimethylolethane or polyglycerol moiety having a degree of polymerization x of from 1 to 6 and the indices $y=(x-z+2)$, $z=0$ to 4, $a=1$ to 15, $=20$ to 100, $c=1$ to 15, $d=20$ to 150 and $e=1$ to 15, with the proviso that the sums $(a+c+e)=3$ to 40, $(b+d)=40$ to 300 and $(c+e)=1$ to 15 and y has a value of at least 1.

Preference is attributed to block polymers in which y is at least 2, a is 1 to 5, b and d independently are 30 to 100, c and e independently are 1 to 5, and the sum $(a+c+e)$ is 3 to 20.

In addition, particular preference is attributed to those block polymers in which R is a glycerol residue or a trimethylolpropane residue, i.e. in which $x=1$. Where R is a glycerol residue, block polymers based on a naturally-occuring glycerol are particularly preferred for the purposes of the invention. In those block polymers derived from glycerol or trimethylolpropane, 2 to 3 hydroxy moieties, i.e., are generally substituted by ethylene glycol ether moieties, i.e. $y=2$ or 3 and $z=0$ or 1.

Water dilutable coating compositions according to this invention contain oleopolyols. In the context of the invention, oleopolyols are understood to be polyols which are derived from naturally occuring fats and/or oils and which may be produced therefrom by chemical methods. Useful oleopolyols comprise triols and polyols containing at least 10 carbon atoms. Preferably they are the adducts of monohydric $C_{1-8}$ alcohols to epoxidized triglyceride oils, the (optionally purified) addition products being reacted with $C_{2-4}$ alkylene oxides. Suitable alcohols are the straight chain alcohols: methanol, ethanol, n-propanol n-butanol, n-pentanol, n-hexanol, n-heptanol, n-octanol or isomers thereof which are branched in the alkyl chain or which carry the hydroxy moiety at a secondary or tertiary carbon atom. Epoxidized triglyeride oils of the type used in the process according to the invention are known as such from the prior art. They are used in other technical fields as "epoxy plasticizers" and are also commercially available for such purposes. They are obtained by epoxidation of unsaturated oils, such as soya oil, linseed oil, tall oil, cottonseed oil, peanut oil, palm oil, sunflower oil, rapeseed oil or neat's foot oil, with peracetic acid, for example by the process described in Journal American Chemical Society 67, 412, (1945). The epoxidation reaction converts the olefinic double bonds of the glyceride-bonded fatty acids completely or partly into oxirane rings, depending on the quantity of peracetic acid. In one embodiment of the invention, the water dilutable coating compositions may contain alkoxylated oleochemical polymers such as castor oil alkoxylates having 0 to 50 ethylene oxide moieties and/or from 1 to 100 propylene oxide moieties. Ring-opening products of epoxidized triglycerides, for example products of soya oil and/or linseed epoxides with methanol, and also castor oil containing from 0 to 10 ethylene oxide moieties and/or from 0 to 40 propylene oxide moieties may also be used as oleochemical polyols in the inventive water dilutable coating compositions.

To guarantee dispersibility or solubility in water, polyurethanes according to the invention must contain one or more ionizable anionic compounds. Dihydroxy and/or diamino compounds containing a carboxylate, sulfonate and/or ammonium moiety are preferably used. Dimethylolpropionic acid is particularly preferred.

Suitable isocyanate components are the diisocyanates which may be used for the production of polyurethanes, for example the diisocyantes described in U.S. Pat. No. 4,489,135 and 4,558,090, both of which are incorporated herein by reference. Aliphatic diisocyanates are preferred, more especially isophorone diisocyantes, 4,4-methylenebis(cyclohexylisocyanate), hexamethylene-1,6-diisocyanate and dimer fatty acid diisocyanate. Blocked or "masked" polyisocyanates may also be used alone or in combination with other inventive isocyanates. These blocked polyisocyanates are stable to hydroxyl groups at room temperature and only react at elevated temperatures, for example under stoving conditions. In one preferred embodiment, water dilutable coating compositions contain a blocked polyisocyanate as additional binding component in a quantity of up to 60% by weight, preferably 1 to 10% by weight, based on the total solids content of the polyurethane dispersions. Organic polyisocyanates suitable for crosslinking may be used in the production of the blocked polyisocyanates. Isocyanates containing from 3 to 36 carbon atoms may be used with advantage. The organic polyisocyanates suitable for use as crosslinking agents in accordance with the ivnention may also be prepolymers derived, for example, from a polyol, including a polyether polyol or a polyester polyol. To this end, polyols are reacted in known manner with an excess of polyisocyanates to form isocyanate terminated prepolymers.

The blocked polyisocyanates are prepared reacting a sufficient quantity of an alcohol with an organic polyisocyanate so that no more free isocyanate groups are present.

Water dilutable coating compositions according to the invention may additionally contain a diamine bearing primary and/or secondary amino moieties. This water soluble diamine may be added to the water as an additional chain extender. Chain extension comprises the reaction of the remaining isocyanate moieties with water to form urea moieties and further polymerization of the polymeric material, all the isocyanate groups being reacted by addtion of a large stoichiometric excess of water. Polyurethanes according to the invention prepared by this method are thermoplastic, i.e. they do not continue hardening to any significant extent after their formation other than by the addition of more hardener.

The coating compositions according to the invention show improved pigmentability in relation to other aqueous dispersions. These advantages are brought about by the above-described polyurethane dispersion which is thus an essential constituent of the coating compositions. The foregoing advantageous properties are achieved where the polyurethane dispersion are used as sole binder. It is nevertheless desirable in many cases to modify the coating compositions for the production of a leveler for the automotive industry or specifically to improve them in regard to certain properties by the combined effect of other binders or hardening components.

Accordingly, the coating compositions may contain a water dilutable melamine resin as an additional binder component.

Water soluble melamine resins are known per se and are widely used in coating compositions. They are etherified melamineformaldehyde condensates. Their solubility in water is determined not only by the degree of condensation, (which should be as low as possible), but also by the etherification component. Hexamethoxymethyl melamine resins are the most important. Where solubilizers are used, butanol etherified melamine resins may also be dispersed in aqueous phase.

Carboxyl moieties may also be introduced into the condensate. Transesterification products of highly etherified formaldehyde condensates with hydroxycarboxylic acids are soluble in water by neutralization through their carboxy moiety and may be used as crosslinking component in the coating compositions according to the invention. Instead of the described melamine resins, it also is possible to use other water soluble or water dispersible amino resins and/or water dilutable phenolic resins.

In addition to the melamine resins or phenolic resins mentioned above, other binder components, such as water dilutable polyester resins and/or water dilutable polyacrylate resins, may be added to the coating compositions according to the invention. In that case, the ratio by weight of melamine resin to polyester resin and/or polyacrylate resin may be adjusted to a value of 1:1–9.

In general, automotive coating levelers (fillers) according to the invention are formulated so that the entire quantity of melamine and/or phenolic resin, polyester and polyacrylate resin, based on the solids content of the polyurethane dispersion, is present in a ratio of 1:0.1–100, for example in ratio of from 1:0.25–0.4. However, resin mixtures in which the polyurethane resin is present in a substoichiometric quantity are preferred. Accordingly, the polyurethane resins are capable, even when added in small quantities, of decisively improving the performance properties of water-soluble polyester resin-melamine resin mixtures for use as automotive coating fillers.

Water dilutable polyesters in the context of the invention are those containing free carboxyl moieties, i.e. polyesters having a high acid number. There are basically two known methods of introducing the necessary carboxyls into the resin system. The first method comprises terminating the esterification at the required acid number. After neutralization with bases, the polyesters thus obtained are soluble in water and form films during stoving. The second method comprises forming partial esters of dicarboxylic or polycarboxylic acids with high-hydroxyl polyesters of low acid number. This reaction is normally carried out with anhydrides of the dicarboxylic acids which are reacted with the hydroxyl component under mild conditions to form a free hydroxyl moiety. The water dilutable polyacrylate resins also contain free carboxyls. They are generally acrylic or methacrylic copolymers in which the carboxyls are derived from the acrylic or methacrylic acid components.

In another embodiment of the invention, water dilutable polyesters in the context of the invention are understood to be "alkyd resin waterborne paints" which have acid numbers of from 10 to 40 and which, after neutralization with amino alcohols, may be made up into clear aqueous preparations in the absence of organic solvents, optionally using emulsifiers which do not affect the water resistance of the hard lacquer film. Waterborne lacquers of this type are described in U.S. Pat. No. 4,555,564, mentioned above, and are prepared by condensing a precondensate having an acid number from 50 to 130 by reaction with alcohols having a functionality of greater than 2, to form a hydrophilic alkyd resin having an acid number below 40, and then dispersing the hydrophilic alkyd resin thus obtained in water in the presence of amino alcohols and, if desired, OH-functional emulsifiers. The process used is characterized in that, to prepare the precondensate:

(a) fatty acids and/or polybasic carboxylic acids or reactive derivatives thereof are reacted with polyfunctional alcohols to form a hydroxyl-terminated polyester having an acid number below 2; and (b) the polyester is converted into the precondensates having an acid number of from 50 to 130 by reaction with polybasic carboxylic acids and/or reactive derivatives thereof.

The coating compositions according to the invention may contain any known inorganic or organic pigments or dyes of the type normally used in the paint industry.

Other additives, such as solvents, fillers, plasticizers, stabilizers, wetting agents, dispersing aids, levelling aids, foam inhibitors, and catalysts may also be added to the coating compositions according to the invention either individually or in admixture in the quantities known from the prior art. These additives may be added to the individual components and/or to the mixture as a whole.

Suitable fillers include: talcum, mica, kaolin, chalk, quartz powder, asbestos powder, powdered shale, barium sulfate, various silicas, silicates, glass fibers, organic fibers, and the like.

Besides water, the coating compositions according to the invention may contain common organic solvents, for example aliphatic or aromatic hydrocarbons, monohydric or polyhydric alcohols, ethers, esters, glycol ethers and their esters, ketones, such as toluene, butanol, ethyl or butyl glycol and their acetates, butyl diglycol, ethylene glycol dimethyl ether, diethylene glycol dimethyl ether, tetraethylene glycol dimethyl ether, cyclohexaane, methylethylketone, acetone, isophorone, N-methylpyrrolidone, or N-ethylpyrrolidone or mixtures thereof. However, prefered formulations are those which are totally or substantially free from solvents or contain at most up to 5% by weight of, in general, substantially involatile solvents.

The present invention also affords a method for the production of a leveler for the automotive industry based on the above defined aqueous polyurethane dispersion. In the method according to the invention, the disclosed hydroxy-terminated polyether polyols together with an optionally alkoxylated polyol are reacted with a disclosed organic diisocyanate in such a mol ratio that an isocyanate-terminated intermediate product is obtained, which is then reacted with a disclosed dihydroxy and/or diamino compound bearing anionic moieties, or optionally with a diamine containing primary. and/or secondary ammonium groups and the polyurethane obtained is subsequently suspended in water.

More particularly, the inventive method comprises reacting a stoichiometric excess of a diisocyanate or a mixture of diisocyanates with the polyether polyols, the (optionally alkoxylated) oleopolyols and the dihydroxy and/or diamine compounds to form an isocyanate-terminated intermediate product.

In one preferred embodiment of the process according to the invention, the polyether polyols and the oleopolyols are first reacted with the diisocyanate to form an isocyanate-terminated prepolymer, after which the prepolymer thus formed is reacted with the reactive hydrogen atoms of the solubilizing compound of the dihydroxy and/or diamino compounds to introduce solubilizing ionic groups. The solubilizing dihydroxy and/or diamino compound may be introduced in the form of a salt and/or added in the form of an acid and neutralized during or after the urethanization reaction.

According to the invention, the water dilutable coating compositions defined above are preferably used for the production of a leveler coating in the automotive industry.

It has been found that polyurethane dispersions alone are not sufficient for achieving the desired improvement in the production of a leveler coating for the automotive industry, even where the polyether polyols and the oleopolyols are used, without the simultaneous use of the dihydroxy and/or diamino compounds. In addition, it also has been found that the functionality of the polyether polyols and their molecular weights are critical to achieving an industrially acceptable automotive leveler coating.

EXAMPLES

Polyols tested:
Polyol I: trifunctional polyether polyol corresponding to formula (1)
Polyol IIa: castor oil
Polyol IIb: ring-opening product of an epoxidized soya oil with methanol
Polyol IIc: castor oil containing 6.1 P.O.
Polyol IId: castor oil containing 3 E.O. and 17 P.O.
Polyol IIe: castor oil containing 2 E.O. and 7 P.O.
Polyol III: dimethylolpropionic acid
  Isocyanates tested:
isophorone diisocyanate
"Desmocap" 11—a trademark of Bayer, F. R. Germany, described as a masked isocyanate based on a branched polymer.

EXAMPLE 1 to 11

| Ingredient | Example 1 pbw | % | Example 2 pbw | % |
|---|---|---|---|---|
| Polyol IIa | 63.98 | 10.07 | 81.28 | 10.42 |
| Polyol I | 80.94 | 12.74 | 102.81 | 13.18 |
| Polyol IIb | — | — | — | — |
| Polyol III | 16.45 | 2.59 | 20.90 | 2.68 |
| N-methylpyrrolidone | 18.04 | 2.84 | 22.93 | 2.94 |
| Isophorone diisocyanate | 100.00 | 15.74 | 100.00 | 12.82 |
| "Desmocap" 11 | — | — | — | — |
| N-methyl morpholine | 13.28 | 2.09 | 16.85 | 2.16 |
| Triethylamine | — | — | — | — |
| Water | | 53.93 | | 55.80 |
| | | 100.00 | | 100.00 |

| Ingredient | Example 3 pbw | % | Example 4 pbw | % |
|---|---|---|---|---|
| Polyol IIa | 62.73 | 10.40 | 46.98 | 6.07 |
| Polyol I | 76.48 | 12.68 | 152.90 | 19.76 |
| Polyol IIb | — | — | — | — |
| Polyol III | 9.41 | 1.56 | 15.63 | 2.02 |
| N-methylpyrrolidone | 18.03 | 2.99 | 18.03 | 2.33 |
| Isophorone diisocyanate | 100.00 | 16.58 | 100.00 | 12.92 |
| "Desmocap" 11 | — | — | — | — |
| N-methyl morpholine | 7.6 | 1.26 | 12.62 | 1.63 |
| Triethylamine | — | — | — | — |
| Water | | 54.53 | | 55.27 |

| Ingredient | Example 5 pbw | % | Example 6 pbw | % |
|---|---|---|---|---|
| Polyol I | 80.96 | 13.35 | 80.96 | 13.35 |
| Polyol IIb | 45.05 | 7.43 | 45.06 | 7.43 |
| Polyol III | 16.43 | 2.71 | 16.43 | 2.71 |
| N-methylpyrrolidone | 18.01 | 2.97 | 18.01 | 2.97 |
| Isophorone diisocyanate | 100.00 | 16.49 | 100.00 | 16.49 |
| "Desmocap" 11 | — | — | — | — |
| N-methyl morpholine | 13.28 | 2.19 | — | — |
| Triethylamine | — | — | 13.28 | 2.19 |
| Water | | 54.86 | | 54.86 |

| Ingredient | Example 7 pbw | % | Example 8 pbw | % |
|---|---|---|---|---|
| Polyol IIc | 62.69 | 9.89 | — | — |
| Polyol IIa | — | — | 31.40 | 3.37 |
| Polyol I | 80.88 | 12.76 | 229.30 | 24.60 |
| Polyol IIb | — | — | — | — |
| Polyol III | 16.45 | 2.60 | 19.85 | 2.13 |
| N-methylpyrrolidone | 18.03 | 2.84 | 31.41 | 3.37 |
| Isophorone diisocyanate | 100.00 | 15.78 | 100.00 | 10.73 |
| "Desmocap" 11 | — | — | — | — |
| N-methyl morpholine | 13.27 | 2.09 | 16.02 | 1.72 |
| Triethylamine | — | — | — | — |
| Water | | 54.04 | | 54.08 |

| Ingredient | Example 9 pbw | % | Example 10 pbw | % |
|---|---|---|---|---|
| Polyol I | 80.88 | 12.14 | 6.39 | 1.28 |
| Polyol IIb | 42.11 | 6.32 | 51.85 | 10.39 |
| Polyol III | 16.46 | 2.47 | 15.42 | 3.09 |
| N-methylpyrrolidone | 18.05 | 2.71 | 22.41 | 4.49 |
| Isophorone diisocyanate | 100.00 | 15.01 | 100.00 | 20.04 |
| "Desmocap" 11 | 62.96 | 9.45 | 29.94 | 6.00 |
| N-methyl morpholine | 13.26 | 1.99 | 12.43 | 2.49 |
| Triethylamine | — | — | — | — |
| Water | | 49.91 | | 52.22 |

| Ingredient | Example 11 pbw | % |
|---|---|---|
| Polyol IId | 90.98 | 13.12 |
| Polyol I | 80.86 | 11.66 |
| Polyol III | 16.43 | 2.37 |
| N-methylpyrrolidone | 18.03 | 2.60 |
| Isophorone diisocyanate | 100.00 | 14.42 |
| m-methyl morpholine | 13.25 | 1.91 |
| Triethylamine | — | — |
| Water | | 53.92 |

| Ingredient | Example 12 (amount) pbw | % |
|---|---|---|
| Polyol IIe | 79.26 | 12.23 |
| Polyol I | 80.56 | 12.43 |
| Polyol III | 16.40 | 2.53 |
| N-methylpyrrolidone | 17.97 | 2.77 |
| Isophorone diisocyanate | 100.00 | 15.34 |
| m-methyl morpholine | 13.22 | 2.04 |
| Water | — | 52.66 |

EXAMPLE 13

A rustproofing primer comprising:

| | |
|---|---|
| 142 | parts by weight alkyd resin microemulsion (accoring to U.S. Pat. No. 4,555,564), 85% in water |
| 119 | parts by weight deionized water |
| 95 | parts by weight iron oxide red |
| 95 | parts by weight zinc phosphate |
| 72 | parts by weight talcum |
| 179 | parts by weight barium sulfate |
| 32 | parts by weight dispersion aid (polyacrylate salt); was prepared and made up into a paint with the following ingredients |
| 43 | parts by weight melamine resin |
| 161 | parts by weight polyurethane dispersion of Example 9 according to the invention |
| 63 | parts by weight deionized water |
| 1000 | parts by weight |

After adjustment with deionized water to a viscosity of approximately 50 seconds, the paint was applied to a compressed air spray gun to a degreased body panel and, after airing for 10 minutes, was stoved for 15 minutes at 160° C.

| | Paint sample without polyurethane dispersion | Paint sample with polyurethane dispersion according to this invention |
|---|---|---|
| Layer thickness | approx. 35 μm | approx. 35 μm |
| Impact test | approx. 30 inch-pounds | approx. 70 inch-pounds |
| Adhesion (DIN 53,151) | CH 2 | CH 0 |

EXAMPLE 14

The following one layer surface coat paint (white) was prepared using a laboratory dissolver:

| | |
|---|---|
| 42 | parts by weight alkyd resins microemulsion, 85% in water, corresponding to Example 13 |
| 42 | parts by weight deionized water |
| 25 | parts by weight dispersion aid (polyacrylate salt) |
| 180 | parts by weight titanium dioxide and made up into a paint with the following contents: |
| 261 | parts by weight alkyd resin microemulsion, 85% in water, corresponding to Example 13 |
| 111 | parts by weight melamine resin |
| 169 | parts by weight polyurethane dispersion of Example 2 according to the invention |
| 170 | parts by weight deionized water |
| 1000 | parts by weight |

For application condition, see Example 13.

| | Paint sample without polyurethane dispersion | Paint sample with polyurethane dispersion according to this invention |
|---|---|---|
| Layer thickness | approx. 35 μm | approx. 35 μm |
| Impact test | 30 inch-pounds | 70 inch-pounds |
| Adhesion (DIN 53,151) | CH 1-2 | CH 0 |
| Gloss (60° <) | approx. 78% | approx. 83% |

EXAMPLE 15

Automotive leveler coating

The following automotive leveler (filler) coating was prepared using a laboratory dissolver:

| | |
|---|---|
| 53 | parts by weight alkyd resin microemulsion, 85% in water, corresponding to Example 13 |
| 53 | parts by weight deionized water |
| 91 | parts by weight titanium dioxide |
| 0.3 | part by weight carbon black |
| 92 | parts by weight barium sulfate |
| 23 | parts by weight dispersion aid and made into a paint with the following contents: |
| 204 | parts by weight alkyd resin microemulsion, 85% in water, corresponding to Example 13 |
| 34 | parts by weight melamine resin |
| 179 | parts by weight polyurethane dispersion of Example 1 according to the invention |
| 270.7 | parts by weight deionized water |
| 1000 | parts by weight |

For application conditions, see Example 13.

Compared to a blank sample, adhesion to a CED painted substrate is increased from a crosshatch index of CH 2 (DIN 53 151) to a crosshatch index of CH 0. The adhesion of subsequent paint layer, especially a paint based on water dilutable alkyd resins, such as the white surface lacquer of Example 14, is improved from a crosshatch index of CH 2 to a crosshatch index of CH 0 (DIN 53,151).

Elasticity as tested with an "Erichsen" type 304 ball impact tester is increased from approximately 30 inch pounds to 70 inch pounds. The stone throw resistance of a two-layer coating comprising the inventive leveler coat and a solvent-containing surface coat, as determined with an "Erichsen" type 508 stone throw tester, is improved from an index of 3-4 to an index of 1-2. The gloss of the coatings, as measured at an angle of 60°, is increased from approximately 45-50% to approximately 60-65%.

COMPARISON EXAMPLES

Polyurethane dispersions were prepared by the process according to the invention and by various other known processes using as the polyol "PPG" 1025 instead of the polyol combinations according to the invention. In the performance tests, all these dispersions produced considerably poorer film properties, including a reduction in gloss, film defects, and tacky surfaces.

We claim:

1. A leveler coating composition consisting essentially of water and dispersed materials selected from the group consisting of blocked polyisocyanates, diamines, water-dilutable melamine resin, water-dilutable polyester resin, water-dilutable polyacrylate resin, and water-dilutable polyurethane resin, all present in amounts effective to form a stable dispersion, said composition having a solids content of about 10–50% by weight, based on the total weight of the dispersion, and a viscosity of about 10–50,000 mPa.s;

wherein at least about 9% by weight of the solids content based on the total weight of the composition if example 15 is the basis of said composition consists essentially of a water-dilutable polyurethane resin that is a product of chemical reaction of all the following components:

(a) hydroxyl-terminated polyether polyols having a functionally of at least 3, a weight average molecular weight of about 1,000–20,000, and a chemical structure according to the general formula $(R^1)_y$—$R^2$—$(R^3)_z$, wherein
$R^1$ is

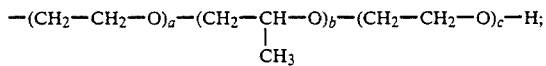

$R^2$ has a valence of x, x being one of the integers 3, 6, 9, 12, 15, or 18, and a formula selected from the group consisting of $R^4$—C—(CH₂O—)₃, where $R^4$ is methyl or ethyl, and

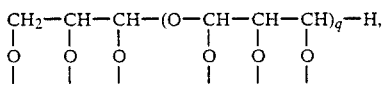

where q is an integer from 0 to 5,
$R^3$ is

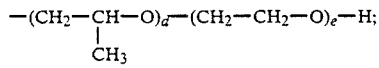

z is 0 to 4; y is (x-z); a is 1 to 15; b is 20 to 100; c is 1 to 15; d is 20 to 150; e is 1 to 15; (a+c+e) is 3 to 40; (b+d) is 40 to 300; and (c+e) is 2 to 15;
(b) polyols selected from the group consisting of
  (1) castor oil,
  (2) products formed by condensing castor oil with up to 50 moles of ethylene oxide per mole of castor oil,
  (3) products formed by condensing castor oil with up to 100 moles of propylene oxide per mole of castor oil,
  (4) products formed by epoxidizing naturally occurring fats or oils containing at least three carbon-carbon double bonds per molecule and then reacting the resulting products with alcohols to open epoxide rings, and
  (5) products formed by epoxidizing naturally occurring fats or oils containing at least three carbon-carbon double bonds per molecule, then reacting the resulting products with alcohols to open epoxide rings, and then condensing the resulting products with $C_{2-4}$ alkylene oxides;
(c) dihydroxy or diamino ionizable anionic compounds; and
(d) organic diisocyanates.

2. The leveler composition of claim 1, wherein said viscosity is about 10–5,000 mPa.s.

3. The leveler coating composition of claim 1 wherein the weight average molecular weight of (a) is about 3,000 to 12,000.

4. The leveler coating composition of claim 2 wherein the weight average molecular weight of (a) is about 3,000 to 12,000.

5. The leveler coating composition of claim 1 wherein (a) is a block polymer wherein:
y is at least 2;
a is 1 to 5;
b is 30 to 100;
c is 1 to 5;
d is 30 to 100;
e is 1 to 5; and
(a+c+e) equals 3 to 20.

6. The leveler composition of claim 1 wherein $R^2$ has a formula derived from either glycerol or trimethylolpropane by removing the hydrogen atom from each —OH group thereof.

7. The leveler coating composition of claim 1 wherein $R^2$ has a formula derived from glycerol by removing one hydrogen atom from each —OH group thereof.

8. The leveler coating composition of claim 6 wherein y is 2 or 3 and z is 0 or 1.

9. The leveler coating composition of claim 1 wherein (b) is a triol or polyol containing at least 10 carbon atoms.

10. The leveler coating composition of claim 1 wherein (c) is a compound containing at least one carboxylate, sulfonate, or ammonium moiety.

11. The leveler coating composition of claim 1 wherein (c) is dimethylolpropionic acid.

12. The leveler coating composition of claim 1 wherein (d) is aliphatic.

13. The leveler coating composition of claim 1 wherein (d) is: isophorone diisocyanate, 4,4-methylenebis(cyclohexylisocyanate); hexamethylene-1,6-diisocyanate; a dimer fatty acid diisocyanate; or a mixture thereof.

14. The leveler coating composition of claim 1 wherein is present a blocked polyisocyanate present in up to 60% by weight, based on the polyurethane dispersion solids content.

15. The leveler coating composition of claim 1 wherein is present a blocked polyisocyanate present in 1 to 10% by weight, based on the polyurethane dispersion solids content.

16. The leveler coating composition of claim 1 wherein is present a diamine containing primary and/or secondary amino moieties.

17. The leveler coating composition of claim 1 wherein is present a water-dilutable melamine resin and/or water dilutable polyester resin and/or a water-dilutable polyacrylate resin whose ratio of melamine resin to polyester and/or acrylate resin is 1:1–9, and which is present in a ratio based upon the solids content of the polyurethane resin, of 1:0.1–100.

18. The leveler coating composition of claim 17 wherein said ratio is 1:0.1–0.9.

19. A process for the manufacture of the composition of claim 1 wherein: ingredient (a) together with ingredient (b) are reacted with ingredient (d) in a mol ratio effective to form an isocyanate-terminated prepolymer; which prepolymer is then reacted with ingredient (c) in a mol ratio effective to form a water-dilutable polyurethane polymer.

20. The process of claim 19 comprising an additional step of reacting the product of reaction among ingredients (a), (b), (c), and (d) further with a diamine containing primary and/or secondary amino groups.

21. A method for finishing automobile bodies comprising applying the leveler coating of claim 1 in a leveler effective thickness, as an intermediate layer in a multilayer finish.

* * * * *

UNITED STATES PATENT AND TRADEMARK OFFICE
CERTIFICATE OF CORRECTION

PATENT NO. : 4,977,207

DATED : December 11, 1990

INVENTOR(S) : Rainer Hoefer et al.

It is certified that error appears in the above-identified patent and that said Letters Patent is hereby corrected as shown below:

In Claim 1, Column 10, lines 58 and 59, delete "based on the total weight of the composition if example 15 is the basis".

In Claim 1, Column 10, line 64, "functionally" should read --functionality--.

Signed and Sealed this

Seventh Day of July, 1992

*Attest:*

DOUGLAS B. COMER

*Attesting Officer* — *Acting Commissioner of Patents and Trademarks*